United States Patent
Bixel (10) Patent No.: US 7,170,767 B2
(45) Date of Patent: *Jan. 30, 2007

(54) SYSTEM AND METHOD FOR REGENERATIVE PWM AC POWER CONVERSION

(76) Inventor: Paul S. Bixel, 1501 Roanoke Blvd., Salem, VA (US) 24153

(*) Notice: Subject to any disclaimer, the term of this patent is extended or adjusted under 35 U.S.C. 154(b) by 28 days.

This patent is subject to a terminal disclaimer.

(21) Appl. No.: 11/040,184

(22) Filed: Jan. 21, 2005

(65) Prior Publication Data
US 2005/0219879 A1 Oct. 6, 2005

Related U.S. Application Data

(63) Continuation of application No. 10/387,368, filed on Mar. 12, 2003, now Pat. No. 6,847,531, which is a continuation of application No. 09/683,422, filed on Dec. 27, 2001, now Pat. No. 6,542,390.

(60) Provisional application No. 60/258,820, filed on Jan. 2, 2001.

(51) Int. Cl.
*H02M 7/00* (2006.01)
(52) U.S. Cl. .............................. 363/65; 363/68; 363/71
(58) Field of Classification Search .................. 363/65, 363/67, 68, 70, 71
See application file for complete search history.

(56) References Cited

U.S. PATENT DOCUMENTS 5,615,102 A * 3/1997 Daijo ........................ 363/132
6,094,362 A * 7/2000 Domingo .................... 363/56.1
6,204,627 B1 * 3/2001 Watanabe et al. ........... 318/729

* cited by examiner

Primary Examiner—Bao Q. Vu
(74) Attorney, Agent, or Firm—Hunton & Williams LLP (57) ABSTRACT

A power conversion system for driving a load is provided. The power conversion system comprises a power transformer having at least one primary winding circuit and at least one secondary winding circuit, the primary winding circuit being electrically connectable to an AC power source. The system further comprises at least one power cell, each of the at least one power cell having a power cell input connected to a respective one of the at least one secondary winding circuit. Each power cell also has a single phase output connectable to the load. A power switching arrangement including at least one power switch is connected to the power cell input and a DC bus, and a switch controller is connected to the power switching arrangement and the power cell input. The power cell also has a PWM output stage having a plurality of PWM switches connected to the DC bus and the single phase output. A local modulation controller is connected to the PWM output stage. The switch controller is adapted for monitoring and controlling a DC bus voltage according to a predetermined control methodology in both a motoring mode in which power from the AC power source is supplied to the load by the at least one power cell and a regeneration mode in which power from the load is supplied to the AC power source by the at least one power cell. The power conversion system also comprises a master controller in communication with the switch controller and the local modulation controller of each of the at least one power cell. The master controller is connectable to the load to monitor power flow thereto.

1 Claim, 8 Drawing Sheets

SYSTEM AND METHOD FOR REGENERATIVE PWM AC POWER CONVERSION

BACKGROUND OF THE INVENTION

The present application is a continuation of U.S. application Ser. No. 10/387,368, filed Mar. 12, 2003 now U.S. Pat. No. 6,847,531, which is a continuation-in-part of U.S. application Ser. No. 09/683,422 filed Dec. 27, 2001 now U.S. Pat. No. 6,542,390, which derives priority from U.S. application Ser. No. 60/258,820 filed Jan. 2, 2001, all of which are incorporated herein by reference in their entirety.

The present invention relates generally to controlling or driving alternating current (AC) motors. More particularly, the present invention relates to a method and apparatus for providing regenerative control of AC motors.

A wide variety of AC medium-voltage variable speed drives for induction motors are known which use a variation of current source topology with a phase-controlled silicon controlled rectifier (SCR) input stage and a 6-pulse or 12-pulse output. This topology may sometimes have the drawbacks of harmonic line currents, a variable power factor, and motor torque pulsations. These traits are especially problematic at higher power levels typical for medium voltage motor drives. Because of these and other disadvantages of the current source topology, pulse width modulated (PWM) circuits are preferred to provide motor control. Pulse width modulation is a form of modulation in which the value of each instantaneous sample of the modulating wave is caused to modulate the duration of a pulse. In PWM, the modulating wave may vary the time of occurrence of the leading edge, the trailing edge, or both edges of the pulse. The modulating frequency may be fixed or variable.

In a PWM circuit, a reference signal may be used to generate a train of pulses, the width of each pulse being related to the instantaneous value of the reference signal. The pulses may be generated by using a comparator to compare the reference signal with a carrier signal, which may be a saw tooth or triangular wave. When the reference signal exceeds the carrier signal, the output of the comparator is high; at other times, the output of the comparator is low. The comparator output does provide a train of pulses representing the reference signal. The pulses are then used to drive an electronic switching device for intermittently applying a voltage across the load.

U.S. Pat. No. 5,625,545, (hereinafter, the "'545 patent") discloses a medium voltage PWM drive and method suitable for controlling medium voltage AC motors, in which a multi-phase power transformer having multiple secondary windings provides multi-phase power to each of a plurality of power cells. Each power cell has a single-phase output and is controlled by a modulation controller. Because the power cells are connected in series, the maximum output voltage for each cell may be less than the maximum line-to-line voltage.

Each power cell of the drive disclosed in the '545 patent may contain an AC-to-DC input rectifier, a smoothing filter, an output single phase DC-to-AC converter, and a control circuit. The input rectifier comprises a diode bridge that accepts three-phase AC input from a secondary winding circuit of the power transformer. The input rectifier transforms three-phase AC power into DC power that may have significant ripple. To ameliorate the effects of such ripple, a smoothing filter composed of electrolytic capacitors is connected to the DC side of the input rectifier. The smoothing filter also connects to the output converter. The output converter comprises a single-phase H-bridge of power transistors, such as, for example, insulated gate bipolar transistors (IGBTs). Each transistor of the output converter is operable by a local modulation control circuit. Signals for controlling the local modulation control circuit are provided by a master modulation controller. This allows the control of the power contribution of the power cell to the overall power supplied to the load.

As exemplified by the drive disclosed in the '545 patent, it is possible to produce a medium-voltage controller with low-voltage power cells by connecting multiple cells in series on each phase output line. Serial connection of cells makes multiple voltage states per phase possible; these multiple voltage states per phase may be used to obtain improved waveforms.

The pulse-width modulation technique of the '545 patent allows selective control of the duration and frequency of power cell pulse outputs. This method can use control signals, based upon interdigitated carrier signals, to selectively cause a switching event in a particular power cell. Typically, switching events are sequenced such that a switching event occurs in only one power cell at a time.

The techniques disclosed in the '545 patent are limited in that they provide a motor drive that cannot be used in a regenerative operation mode; i.e., a mode in which power flows from the motor through the drive to the transformer. A non-regenerative operation (or motoring) mode is operation in which power is supplied by the transformer through the drive to the motor. The master modulation controller in the '545 patent must carefully monitor the power flow in the system to avoid any situation in which power would flow from the motor into the drive. Failure to control the power flow would lead to an overvoltage situation developing within the power cell since the power cell has no means to dispose of power from the motor. The internal diode rectifier does not permit power to flow back to the AC mains connected to the drive. This effectively prevents the use of the drive in a regenerative mode.

SUMMARY OF THE INVENTION

An aspect of the present invention provides a power conversion system for driving a load. The power conversion system comprises a power transformer having at least one primary winding circuit and at least one secondary winding circuit, the primary winding circuit being electrically connectable to an AC power source. The system further comprises at least one power cell, each of the at least one power cell having a power cell input connected to a respective one of the at least one secondary winding circuit. Each power cell also has a single phase output connectable to the load. A power switching arrangement including at least one power switch is connected to the power cell input and a DC bus, and a switch controller is connected to the power switching arrangement and the power cell input. The power cell also has a PWM output stage having a plurality of PWM switches connected to the DC bus and the single phase output. A local modulation controller is connected to the PWM output stage. The switch controller is adapted for monitoring and controlling a DC bus voltage according to a predetermined control methodology in both a motoring mode in which power from the AC power source is supplied to the load by the at least one power cell and a regeneration mode in which power from the load is supplied to the AC power source by the at least one power cell. The power conversion system also comprises a master controller in communication with the switch controller and the local modulation controller of each of the at least one power cell. The master controller is connectable to the load to monitor power flow thereto.

Other objects and advantages of the invention will be apparent to one of ordinary skill in the art upon reviewing the detailed description of the invention.

BRIEF DESCRIPTION OF THE DRAWINGS

The features and advantages of the present invention will be understood more clearly upon reading the following Detailed Description of exemplary embodiments in conjunction with the accompanying drawings, in which.

DETAILED DESCRIPTION OF THE INVENTION

The present invention provides a multiphase AC power conversion methodology for use in power conversion systems configured for driving an AC motor. The power conversion methodology uses power conversion cells that may be configured to operate in both motoring and regenerative operation modes. In addition to the power cells, the power conversion systems of the invention comprise a multiphase transformer configured to supply multiphase power to each power cell. The transformer may comprise one or more primary windings driving a plurality of secondary windings, each secondary winding being used to power a single power cell, which, in turn, provides single phase AC power to a load such as an AC motor. Multiple power cells having the same output phase may be connected in series to achieve the desired voltage level to be supplied to the load. The voltage provided by each power cell may be controlled using a modulation controller that is connected to each of the power cells.

The power cells are configured with a rectifying input stage comprising power switching arrangement having a plurality of power switches for controlling power flow between the motor and the transformer The power switches control the DC bus voltage in the power cell. When the power switches are IGBTs they may also be used to control VARs generated by the power cells in a way that is advantageous to the owner of the equipment. The power cells also include a pulse width modulation (PWM) output stage that controls the output to the motor when the power conversion system is in motoring mode. Each power cell may also include a smoothing capacitor disposed between the rectifying input stage and the PWM output stage.

The power cells of the power conversion system of the invention also include a switch controller that may be configured according to the type of power switches used in the power switching arrangement. Further the power switching arrangement may be configured and operated according to a number of control methodologies, which will be described in more detail hereafter.

Figure 1:
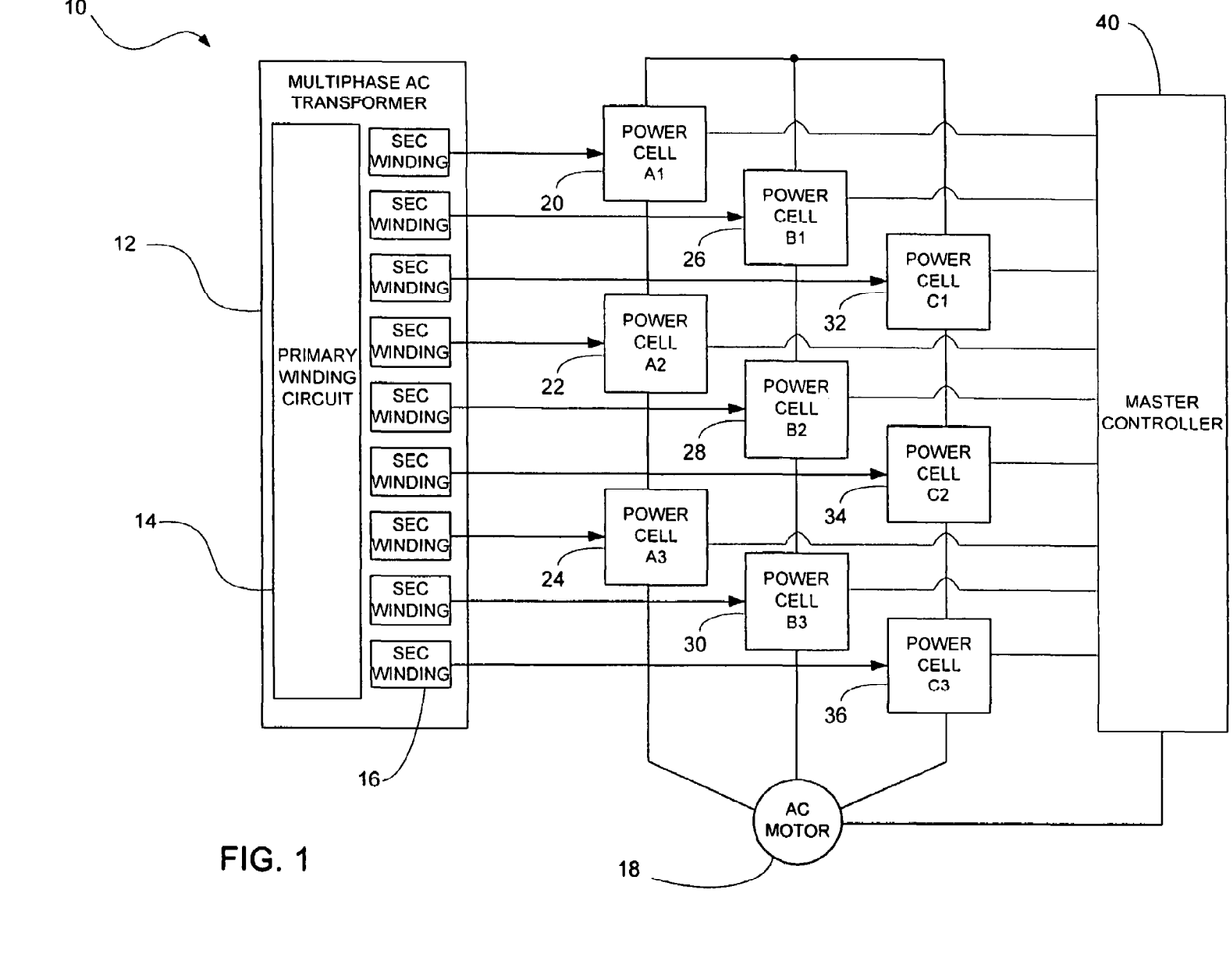
FIG. 1 is a diagram of a topology for a motor drive in which power cells according to embodiments of the invention may be used.

With reference to the drawings, the invention will now be discussed in more detail. FIG. 1 illustrates an exemplary embodiment of a power conversion system 10 according to the invention. The power conversion system 10 comprises a multi-phase AC power transformer 12 that provides multiphase power to each of a plurality of power cells 20, 22, 24, 26, 28, 30, 32, 34, 36. Each power cell converts the multiphase input power to a conditioned, single phase output, which is supplied to an AC motor 18. Embodiments of the invention may also be used to supply power to a DC motor or any other load.

Illustratively, the power transformer 12 may include a primary winding circuit 14 that is powered by a three-phase AC power source (not shown). The primary winding circuit 14, which may be star- or mesh-connected, may be used to energize a plurality of three-phase secondary winding circuits 16. The secondary winding circuits 16 may be mesh-connected or star-connected to lower the supply transformer's K-factor and to improve harmonics control. Mesh-connected windings may include, for example, delta or extended delta configurations. Star-connected windings may include, for example, wye or zig zag configurations. Under certain circumstances, the secondary windings 16 may be manipulated to advance some of the secondary windings 16 by preselected degrees of electrical phase and to retard other secondary windings 16 by preselected degrees of electrical phase. Some of the secondary windings 16 may remain substantially unshifted in phase.

It will be understood by those having ordinary skill in the art that other transformer configurations capable of providing multiphase power to the power cells may also be used in the present invention. It will also be understood that single phase secondary windings may be used in the transformer 12.

In the power conversion system 10 shown in FIG. 1, power cells A1, A2, and A3 (ref. nos. 20, 22 and 24, respectively) each provide output power having phase A. Power cells B1, B2, and B3 (ref. nos. 26, 28 and 30, respectively) each provide output power having phase B. Power cells C1, C2, and C3 (ref. nos. 32, 34 and 36, respectively) each provide output power having phase C. As shown, power cells providing the same output phase may be connected in series on a common output line. This makes it possible to produce a medium-voltage phase line input to the AC motor using a plurality of low-voltage power cells. Each power cell may therefore be constructed internally to low-voltage standards. For example, each power cell may have a 600-volts rating, despite its inclusion in a medium-voltage apparatus. Serial connections also make multiple voltage states per phase possible. These multiple voltage states per phase may be used to obtain improved current waveforms. In such an embodiment, the individual power cells may be isolated from ground, and other power cells, using insulation suitable for the medium voltage level being used.

In the power conversion system 10 illustrated in FIG. 1, three power cells are provided per phase output line. Due to the serial connection between three of the power cells in each phase output line (e.g., power cells A1, A2 and A3 in the phase A output line) it is possible to produce a maximum output voltage magnitude of about 1800 VDC. above neutral using power cells rated at 600 volts. As will be discussed in more detail hereafter, the output of each power cell may be separately controlled to provide any voltage level below its upper limit. Thus, the output line voltage for each phase can be separately controlled to provide an output of any level between 0 and 1800 VDC.

In other embodiments, circuits using greater or fewer than three power cells per phase may be used to satisfy the voltage requirements of the inductive motor load. For example, in one embodiment which can be applied to 2300 VAC inductive motor loads, three power cells are used for each of the three phase output lines. However, in another embodiment, which may be applied to a 4160 VAC inductive motor load, five power cells may be used for each of the three phase output lines.

Individual and collective control of the power cells of the power conversion system 10 is provided by a master controller 40, which is in communication with each power cell. The master controller 40 monitors the power flow to and output of the AC motor 18. As will be discussed in more detail hereafter, the master controller 40 controls the output of each power cell and may be used to control changes in operating mode of the power conversion system 10.

Figure 2:
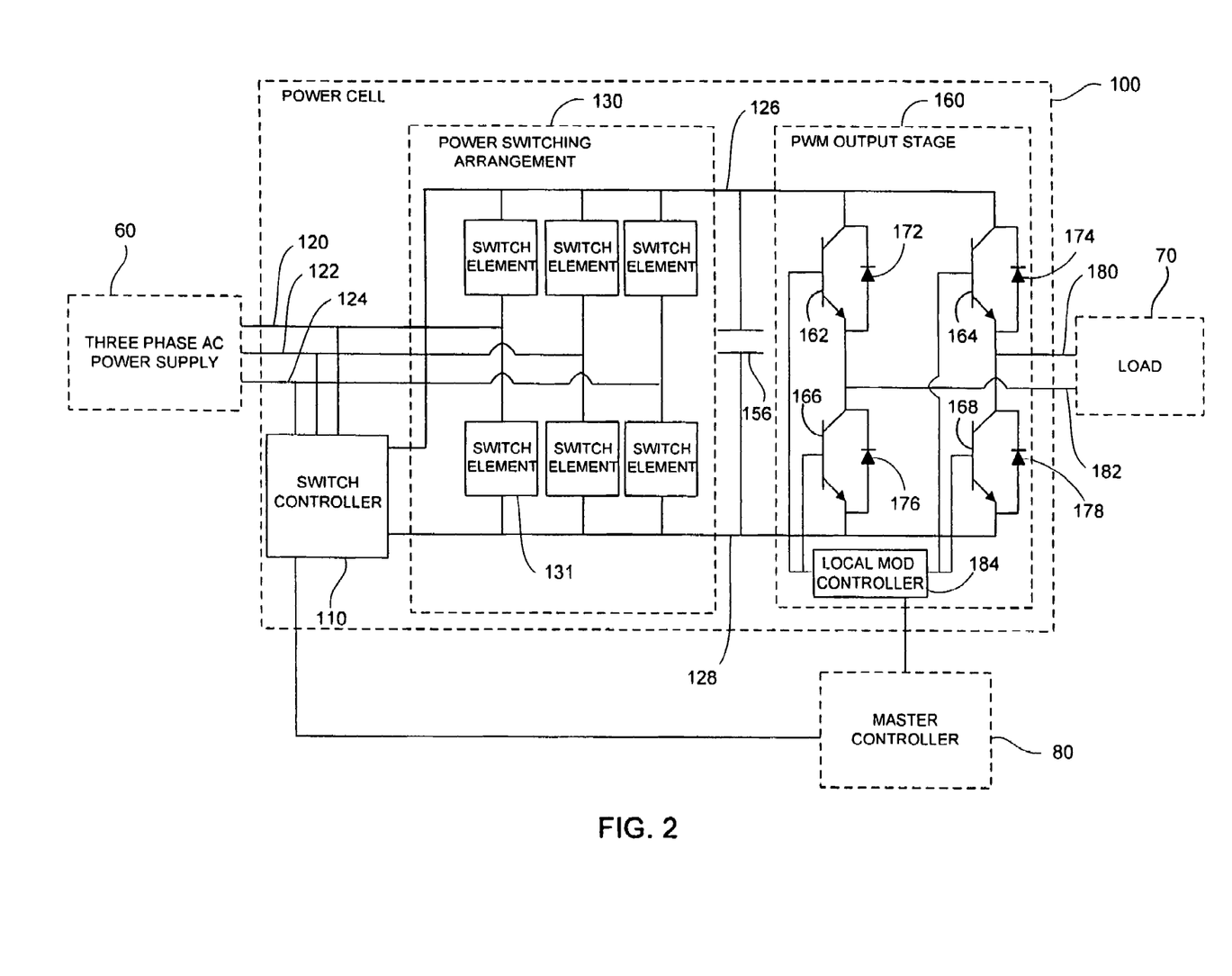
FIG. 2 is a diagram of a power cell topology according to an embodiment of the invention.

A power cell 100 according to an illustrative embodiment of the present invention is illustrated in FIG. 2. In a motoring mode, the power cell 100 receives three phase AC power from a power supply 60 that may be the secondary windings of a power transformer such as the multiphase AC power transformer 12 of the power conversion system 10 of FIG. 1. The three-phase AC power is received via three separate phase lines 120, 122, 124. The power cell 100 converts the three-phase AC power into filtered DC power using a 3-phase power switching arrangement 130 and a smoothing capacitor 156. The filtered DC power is then supplied to a load 70 using a pulse width modulation (PWM) output stage 160. The load 70 may be an AC motor such as the motor 14 of FIG. 1, a DC motor or any other load that may operate in either a power receiving or power supplying mode. In a regenerative mode, the power cell 100 receives power from the load (motor) 70 and passes it back to the power supply 60 via the power switching arrangement 130.

In the motoring mode, the power switching arrangement 130 serves as a rectifier, converting the three phase AC input from the three phase lines 120, 122, 124 into a DC output. Rectification can produce both a DC current and ripple current. Single-phase H-bridge output converters can reflect a ripple current at twice the frequency of an AC motor being driven. The DC output currents of the power switching arrangement 130 generally will match the DC current of the output stage 160, but the instantaneous ripple currents generally will not match. The power cell 100 may therefore include a smoothing capacitor 156 across the bus lines 126, 128 to act as a current smoothing filter, to carry the difference ripple current. It will be understood by those having ordinary skill in the art that the smoothing capacitor 156 may be a plurality or bank of capacitors combined in series to condition the output of the power switching arrangement 130. The precise capacitor values may depend upon the power requirements of the inductive load.

The DC power, thus conditioned, can be selectively supplied to output lines 180 and 182 using the PWM method. Pulse-width modulation may be effected using a bridge converter which is composed of semiconductor switches (hereinafter, "PWM switches"). Such PWM switches are preferred to be power transistors as shown by transistors 162, 164, 166, 168. It is also preferred that transistors 162, 164, 166, 168 be either fully ON or fully OFF as they operate, and not significantly modulate pulse amplitude.

The power transistors 162, 164, 166, 168 are connected in a single-phase H-bridge configuration. To form the H-bridge configuration, the emitter of transistor 162 may be connected to the collector of transistor 166 to form a first transistor pair. Similarly, the emitter of transistor 164 may be connected to the collector of transistor 168 to form a second transistor pair. The first and second transistor pairs are each connected to the DC bus lines 126, 128 with the collectors of transistors 162, 164 being connected to the positive side (bus line 126) and the emitters of transistors 166, 168 being connected to the negative side (bus line 128).

Overvoltage protection of each of transistors 162, 164, 166, 168 may be accomplished by use of anti-parallel diodes 172, 174, 176, 178. In such an arrangement, the cathodes of diodes 172, 174, 176, 178 are connected to the collectors of transistors 162, 164, 166, 168, respectively, and the anodes of diodes 172, 174, 176, 178 are connected to the emitters of transistors 162, 164, 166, 168, respectively. Power transistors 162, 164, 166, 168 may be, for example, bipolar transistors or insulated gate bipolar transistors (IGBTs). Often such transistors include the anti-parallel diodes in one package.

Power, in the form of pulse-width-modulated pulses, is delivered to a first phase output line 180 by a connection between the emitter of transistor 174 and the collector of transistor 178. Likewise, power is delivered to a second phase output line 182 by a connection between the emitter of transistor 162 and the collector of transistor 166.

Transistors 162, 164, 166, 168 may be controlled by a local modulation controller 184, which receives controlling signals from a master controller 80 configured to control multiple power cells 100. The local modulation controller 184 can select either of transistor 162 or 166 to be ON, and either of transistor 164 or 168 to be ON, which will permit power to pass to a load 70 by way of the first phase output line segment 180 or the second phase output line segment 182, respectively.

The power switching arrangement 130 includes a pair of controllable switch elements 131 for each phase line 120, 122, 124. These switch elements 131 are configured in a bridge arrangement to control the DC bus voltage, which is defined as the voltage between the first and second bus lines 126, 128. The operation of the switch elements 131 is controlled by a switch controller 110 that is connected to the first and second bus lines 126, 128 and is capable of sensing a magnitude of the DC bus voltage. The switch controller 110 is configured to control operation of the switch elements 131 so as to allow selective control of the DC bus voltage and the mode of operation (i.e., motoring mode or regenerative mode) of the power cell. The switch controller 110 may be configured or programmed to operate according to specific control methodologies tailored to the type of switch elements used.

Figure 3:
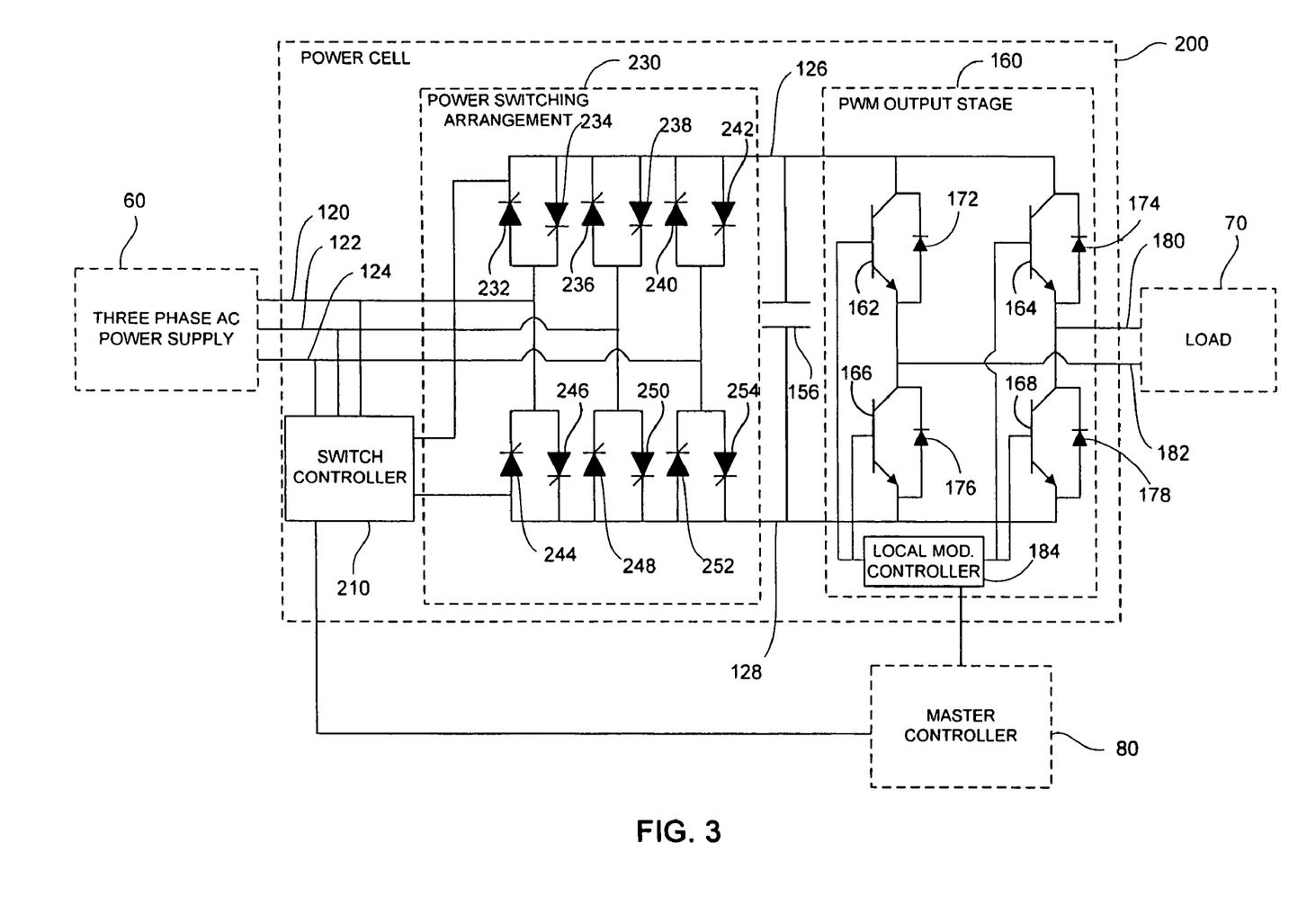
FIG. 3 is a diagram of a power cell topology according to an embodiment of the invention.

The power switching arrangement 130 may be configured to use unidirectional switches such as SCRs or bidirectional switches such as IGBTs. In accordance with one aspect of the invention, the power switching arrangement 130 may comprise a plurality of SCRs arranged to provide control of the DC bus voltage in both motoring and regenerative modes. With reference to FIG. 3, a power cell 200 receives three phase AC power from a power supply 60 via the three separate phase lines 120, 122, 124. The power cell 200 converts the three-phase AC power into filtered DC power using a 3-phase power switching arrangement 230 and a smoothing capacitor 156. The filtered DC power is then supplied to a load 70 using a PWM output stage 160, which is substantially identical to that described above for the power cell 100 of FIG. 2.

The power cell 200 includes a power switching arrangement 230 having a first set of six SCRs 232, 234, 236, 238, 240, 242 connected in parallel with a second set of six SCRs 244, 246, 248, 250, 252, 254, the two sets being connected to the first and second bus lines 126, 128, respectively. Two opposing SCRs in each set are connected in parallel to each of the three phase lines 120, 122, 124. Thus, in the first set, two opposing SCRs 232, 234 are connected in parallel between the first phase line 120 and the first bus line 126, two opposing SCRs 236, 238 are connected in parallel between the second phase line 122 and the first bus line 126, and two opposing SCRs 240, 242 are connected in parallel between the third phase line 124 and the first bus line 126. Similarly, in the second set, two opposing SCRs 244, 246 are connected in parallel between the first phase line 120 and the second bus line 128, two opposing SCRs 248, 250 are connected in parallel between the second phase line 122 and the second bus line 128, and two opposing SCRs 252, 254 are connected in parallel between the third phase line 124 and the second bus line 128.

The power switching arrangement 230 operates in a DC bus voltage regulation mode such that when the DC voltage rises beyond a predetermined threshold, the SCRs in the power switching arrangement 230 are gated to reduce the DC bus voltage. The switch controller 210 of the power cell 200 is connected to the first and second bus lines 126, 128 and is capable of sensing a magnitude of the DC bus voltage. The switch controller 210 provides signals to gate each of the SCRs in the power switching arrangement 230. The switch controller 210 operates in a first DC bus voltage regulation mode such that when the DC voltage raises beyond a predetermined threshold (e.g., 1% above a predetermined DC bus voltage value), the controller 210 commands the gates of each of the SCRs such that the DC bus voltage is reduced. This allows the power cell to maintain the DC bus voltage at a desired level. In addition to providing the capability to control the DC bus voltage, the power switching arrangement 230 also provides flexibility in that the SCRs may be gated to produce any voltage below their allowable limits. Control methodologies that may be used to accomplish this are discussed below.

As shown, the controller 210 may also be connected to the input phase lines 120, 122, 124 to sense the AC line voltage present in the input phase lines 120, 122, 124, and may be suitably configured and/or programmed to determine the phase of the input waveform. Based on this phase determination, the controller 210 can determine a phase advance for gating the SCRs. In one implementation, the switch controller 210 monitors the AC waveform and uses the "zero crossing" (when the AC voltage reverses polarity) to determine a phase adjustment for firing or gating the SCRs. This input will be related to the current flow.

The power switching arrangement 230 is configured to limit and control the DC bus voltage in both motoring and regenerative modes with all of the SCRs connected in one direction (forward-conducting SCRs 232, 236, 240, 244, 248, 252) controlling the DC bus voltage in the motoring mode and all of the SCRs connected in the opposing direction (reverse-conducting SCRs 234, 238, 242, 246, 250, 254) controlling the DC bus voltage in the regenerative mode.

Figure 4:
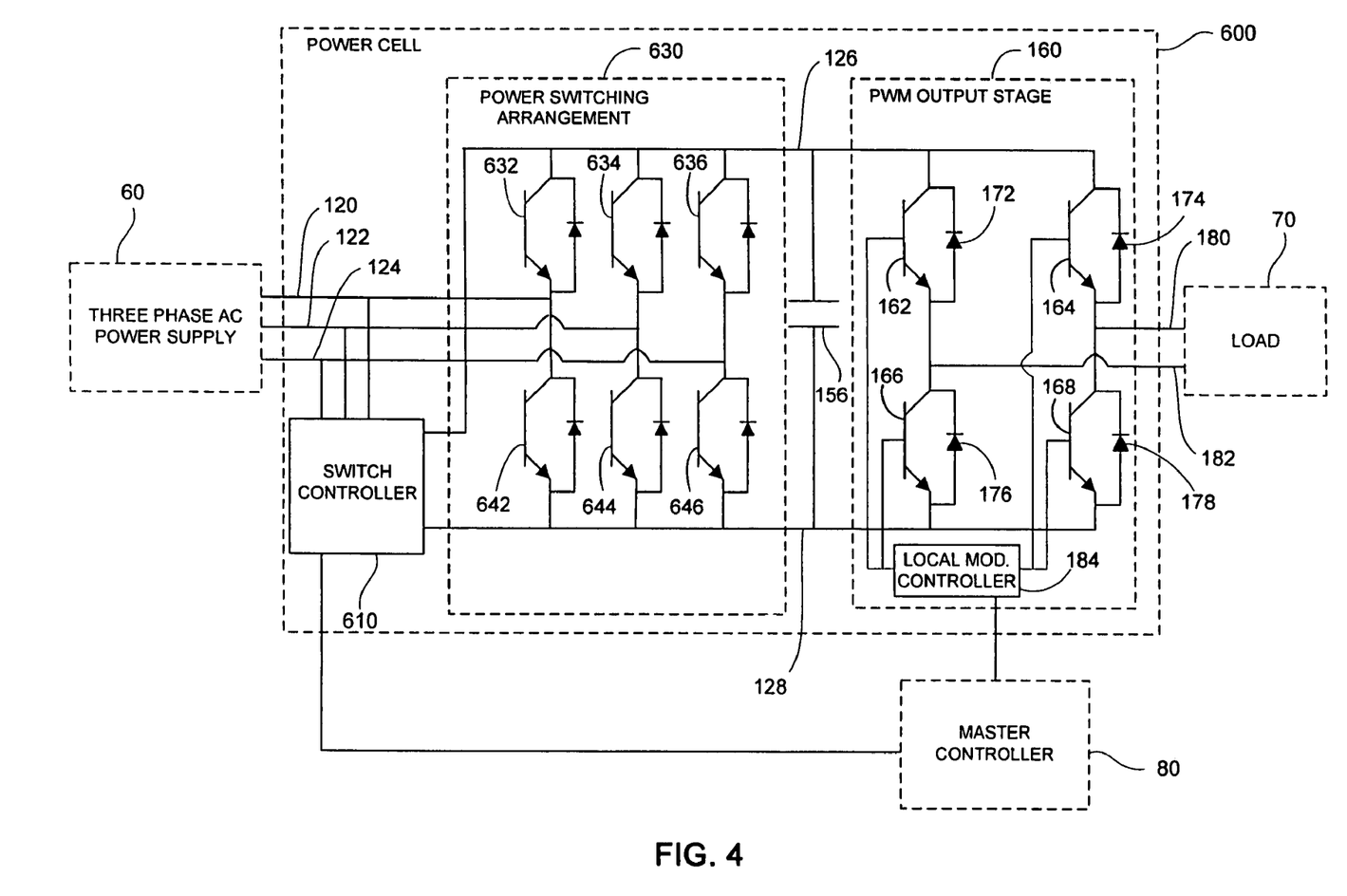
FIG. 4 is a diagram of a power cell topology according to an embodiment of the invention.

In accordance with another aspect of the invention, the power switching arrangement 130 of the power cell 100 of FIG. 2 may comprise a plurality of IGBTs rather than SCR pairs. With reference to FIG. 4, a power cell 600 receives three phase AC power from a power supply 60 via the three separate phase lines 120, 122, 124. The power cell 600 converts the three-phase AC power into filtered DC power using a 3-phase power switching arrangement 630 and a smoothing capacitor 156. The filtered DC power is then supplied to a load 70 using a PWM output stage 160, which is substantially identical to that described above for the power cell 100 of FIG. 2.

The power cell 600 includes a power switching arrangement 630 having three pairs of IGBTs connected to the first and second bus lines 126, 128. A first pair of IGBTs 632, 642 are connected to the first phase line 120, a second pair of IGBTs 634, 644 are connected to the second phase line 122, and a third pair of IGBTs 636, 646 are connected to the third phase line 124.

The power switching arrangement 630 operates in a DC bus voltage regulation mode such that when the DC voltage rises beyond a predetermined threshold, the IGBTs in the power switching arrangement 630 are gated to reduce the DC bus voltage. The switch controller 610 of the power cell 600 is connected to the first and second bus lines 126, 128 and is capable of sensing a magnitude of the DC bus voltage. The switch controller 610 provides signals to the gates of each IGBT in the power switching arrangement 630. The switch controller 610 operates in a first DC bus voltage regulation mode such that when the DC voltage raises beyond a pre-determined threshold (e.g., 1% above a pre-determined DC bus voltage value), the controller 610 commands controls the IGBTs such that the DC bus voltage is reduced. This allows the power cell to maintain the DC bus voltage at a desired level.

As shown, the controller 610 may also be connected to the input phase lines 120, 122, 124 to sense the AC line voltage present in the input phase lines 120, 122, 124, and may be suitably configured and/or programmed to determine the phase and voltage of the input waveform. Based on the phase and voltage, the controller 610 can determine the optimum gating pattern to apply to the IGBTs. In one implementation, the switch controller 610 uses a PLL to monitor the phase and voltage of the input waveform. In another implementation, the switch controller receives phase and voltage information from the master controller 80.

Figure 5:
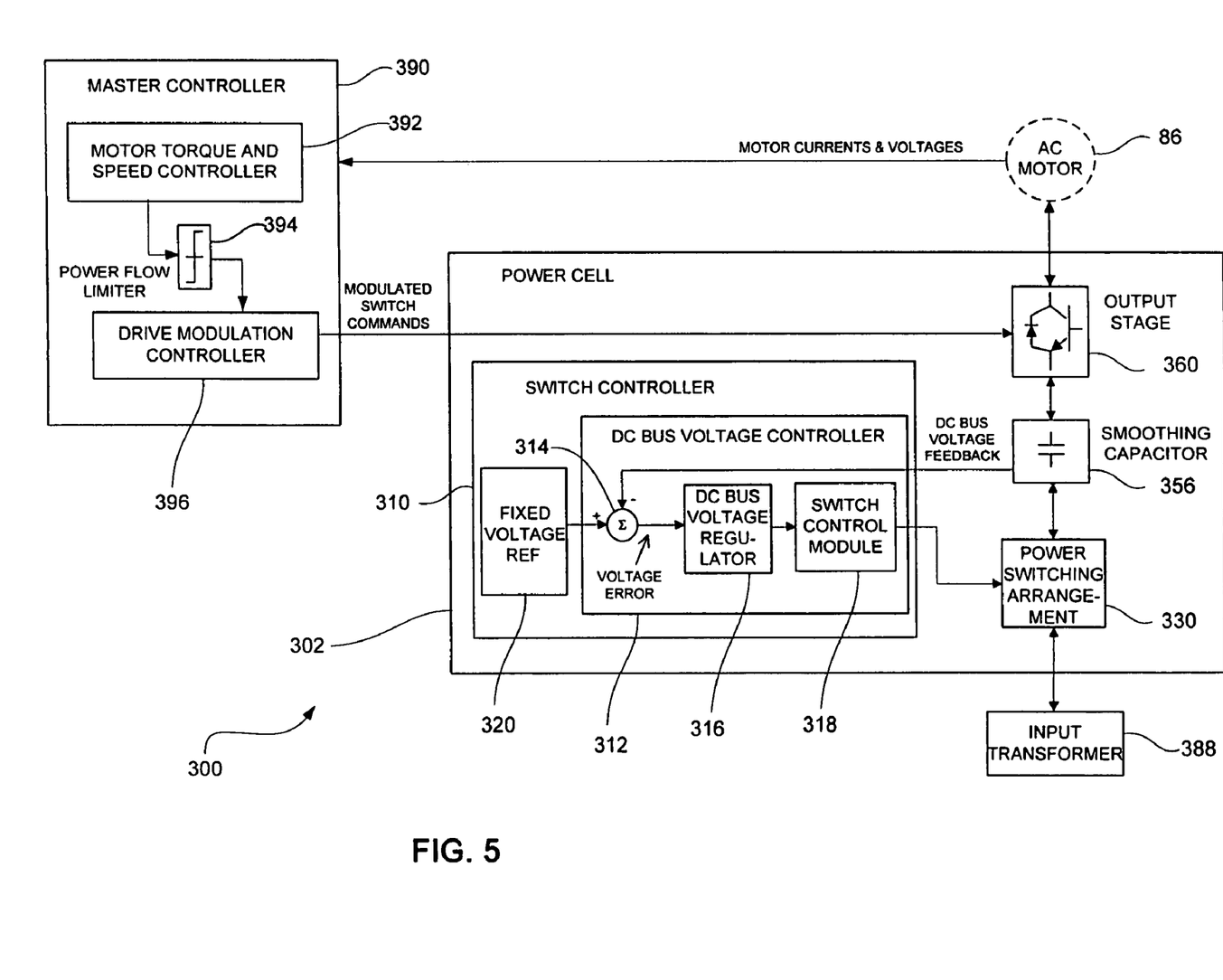
FIG. 5 is a block diagram illustrating a power cell control system according to an embodiment of the invention.

FIG. 5 illustrates a block diagram of a regenerative AC power conversion system 300 according to an aspect of the present invention. The power conversion system 300 includes a master controller 390 configured for modulation control of multiple power cells 302 to provide power to an AC motor 86. The power conversion system 300 further includes an input power transformer 388 that may be configured to receive power from a multiphase AC power source (not shown) and supply it to a plurality of power cells 302. In FIG. 5, only a single power cell 302 is illustrated. It will be understood, however, that the power conversion system 300 may include any number of power cells 302.

The block diagram of FIG. 5 illustrates the features of a particular control methodology that may be used in conjunction with power cells of the present invention. The master controller 390 of the power conversion system 300 includes a motor torque and speed controller. 392, a power flow limiter 394 and a drive modulation controller 396. The master controller 390 monitors the currents and voltages in the AC motor 86. The power flow to and from the AC motor 86 is monitored by the motor torque and speed controller 392. When in motoring mode, the drive modulation controller 396 uses modulated switch commands to control the power transistors of the PWM output stage 360 in order to maintain the power flow to the AC motor 86 within the predetermined limits programmed into the power flow limiter 394.

The power cell 302 of the power conversion system 300 includes a power switching arrangement 330, a smoothing capacitor 356 and a PWM output stage 360, all of which may be configured according to the topology of the power cell 100 of FIG. 2. The power switching arrangement 330 is configured to include power switches that control the DC bus voltage in the motoring mode and in the regenerative operation mode. These switches may be SCRs as in the power cell 200 of FIG. 3, IGBTs as in the power cell 600 of FIG. 4, or other power switches of similar capability. The power cell 302 includes a switch controller 310 that includes a DC bus voltage controller 312 configured to monitor the DC bus voltage across the smoothing capacitor 356. The DC bus voltage controller 312 is wired or programmed to include a summing junction 314 that subtracts the DC bus voltage value from a predetermined fixed voltage reference value 320 to determine a bus voltage error. The fixed voltage reference value 320 may be pre-programmed into the switch controller 310. The output of the summing junction 314 may be filtered using a high pass filter (not shown) to provide a filtered bus voltage error signal. The switch controller 310 further includes a DC bus voltage regulator 316 which receives the bus voltage error signal and determines if the power switches of the power switching arrangement 330 should be gated to reduce or increase the DC bus voltage. Responsive to a determination that the DC bus voltage is outside predetermined limits, a signal is sent to a switch control module 318 which determines and sends gating commands to the appropriate power switches for reducing or increasing the DC bus voltage.

When the power switches used are SCRs, the forward SCRs in the power switching arrangement are used to control the DC bus voltage in the power cell. This ensures that the DC Bus voltage is never too high to prevent the correct operation of the reverse SCRs in the event of regeneration, thereby freeing the master controller 390 from a zero regeneration limit. Accordingly, a non-zero regeneration limit may be enforced by the master controller 390. The new limit may be a function of the capacity of the power switching arrangement to conduct current. Such limits depend on the heatsinks, conductors and packages used to construct the power switching arrangement.

Accordingly, the power conversion system 300 is fully operable in both motoring and regeneration modes. In addition, the power conversion system 300 provides for highly rapid switching from motoring to regeneration and back.

As suggested by FIG. 5, the switch controller 310 may be physically located on the power cell 302. It will be understood by those of ordinary skill in the art that the switch controller 310 may alternatively be located in the master controller 390. In such embodiments, the master controller would include a switch controller 310 for each power cell 302 in the power control system.

Figure 6:
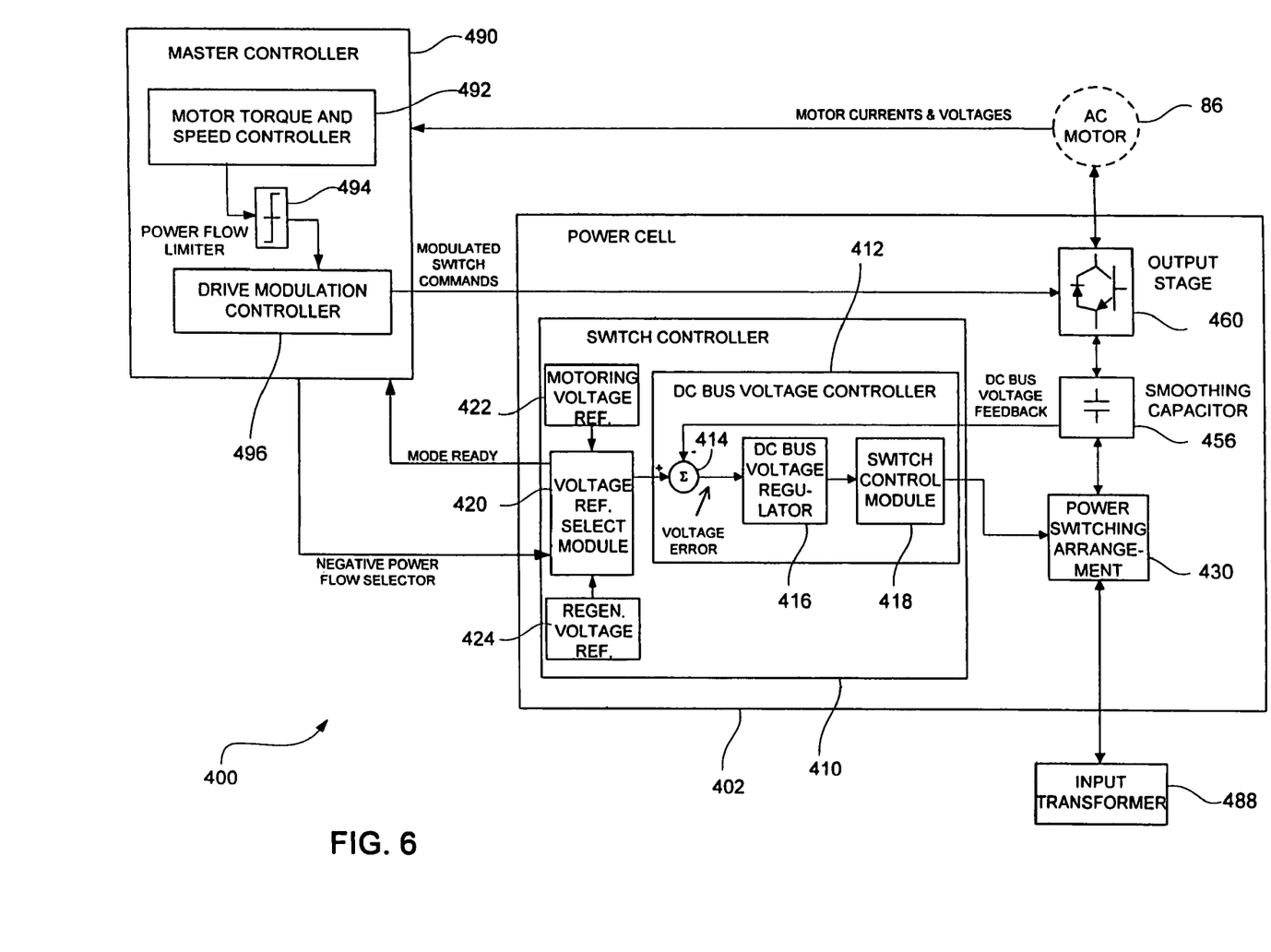
FIG. 6 is a block diagram illustrating a power cell control system according to an embodiment of the invention.

FIG. 6 illustrates a block diagram of a regenerative AC power conversion system 400 according to an aspect of the present invention. The power conversion system 400 includes a master controller 490 configured for modulation control of multiple power cells 402 to provide power to an AC motor 86. The power conversion system 400 further includes an input power transformer 488 that may be configured to receive power from a multiphase AC power source (not shown) and supply it to a plurality of power cells 402. In FIG. 6, only a single power cell 402 is illustrated. It will be understood, however, that the power conversion system 400 may include any number of power cells 402.

The block diagram of FIG. 6 illustrates the features of a particular control methodology that may be used in conjunction with power cells of the present invention. The master controller 490 of the power conversion system 400 includes a motor torque and speed controller 492, a power flow limiter 494 and a drive modulation controller 496. The master controller 490 monitors the currents and voltages in the AC motor 86. The power flow to and from the AC motor 86 is monitored by the motor torque and speed controller 492. When in motoring mode, the drive modulation controller 496 uses modulated switch commands to control the power transistors of the PWM output stage 460 in order to maintain the power flow to the AC motor 86 within the predetermined limits programmed into the power flow limiter 494.

The power cell 402 of the power conversion system 400 includes a power switching arrangement 430, a smoothing capacitor 456 and a PWM output stage 460, all of which may be configured according to the topology of the power cell 100 of FIG. 2. The power switching arrangement 430 is configured to include power switches that control the DC bus voltage in the motoring mode and in the regenerative operation mode. These switches may be SCRs as in the power cell 200 of FIG. 3, IGBTs as in the power cell 600 of FIG. 4, or other power switches of similar capability. The power cell 402 includes a switch controller 410 that includes a DC bus voltage controller 412 configured to monitor the DC bus voltage across the smoothing capacitor 456. The DC bus voltage controller 412 is wired or programmed to include a summing junction 414 that subtracts the DC bus voltage value from a voltage reference value. The voltage reference value is determined by a voltage reference selection module 420 that is in communication with the master controller 490. The voltage reference selection module 420 determines whether to provide a motoring voltage reference value 422 or a regenerative voltage reference value 424 depending on the operating mode of the power conversion system 400. Both the predetermined motoring voltage reference value 422 and a regeneration voltage reference value 424 may be programmed or otherwise stored in the switch controller 410. The operating mode of the system may be signaled to the voltage reference selection module 420 by the master controller 490. Illustratively, this may take the form of a negative power flow signal to request a change in operating mode in advance of the master controller 490 actually commanding reverse power flow.

Based on the signal from the master controller 490, the voltage reference selection module 420 selects the proper voltage reference and provides it to the summing junction 414. The DC bus voltage is then subtracted from the voltage reference to determine the bus voltage error. The output of the summing junction 414 may be filtered using a high pass filter (not shown) to provide a filtered bus voltage error signal. The switch controller 410 further includes a DC bus voltage regulator 416 which receives the bus voltage error signal and determines if the power switches of the power switching arrangement 430 should be gated to reduce or increase the DC bus voltage. Responsive to a determination that the DC bus voltage is outside predetermined limits, a signal is sent to a switch control module 418 which determines and sends gating commands to the appropriate power switches for reducing or increasing the DC bus voltage. When the voltage error signal has been reduced to an acceptable level, a mode ready signal may be sent to the master controller 490 to indicate it is safe to proceed with regenerative power flow (i.e., change the negative power flow limit value used by the power flow limiter 494).

When SCRs are used as the power switches in the power switching arrangement 430, the switch control module 418 may be adapted to prevent gating of the SCRs during transition from the motoring mode to the regenerative mode. Preventing SCR gating while transitioning from the motoring voltage reference value 422 to the regenerative voltage reference value 424 results in a natural reduction in voltage due to the power being delivered to the AC motor 86 or other losses in the system. This serves to prevent an overvoltage situation that would prevent the correct operation of the SCRs.

As suggested by FIG. 6, the switch controller 410 may be physically located on the power cell 402. It will be understood by those of ordinary skill in the art that the switch controller 410 may alternatively be located in the master controller 490. In such embodiments, the master controller would include a switch controller 410 for each power cell 402 in the power control system.

Figure 7:
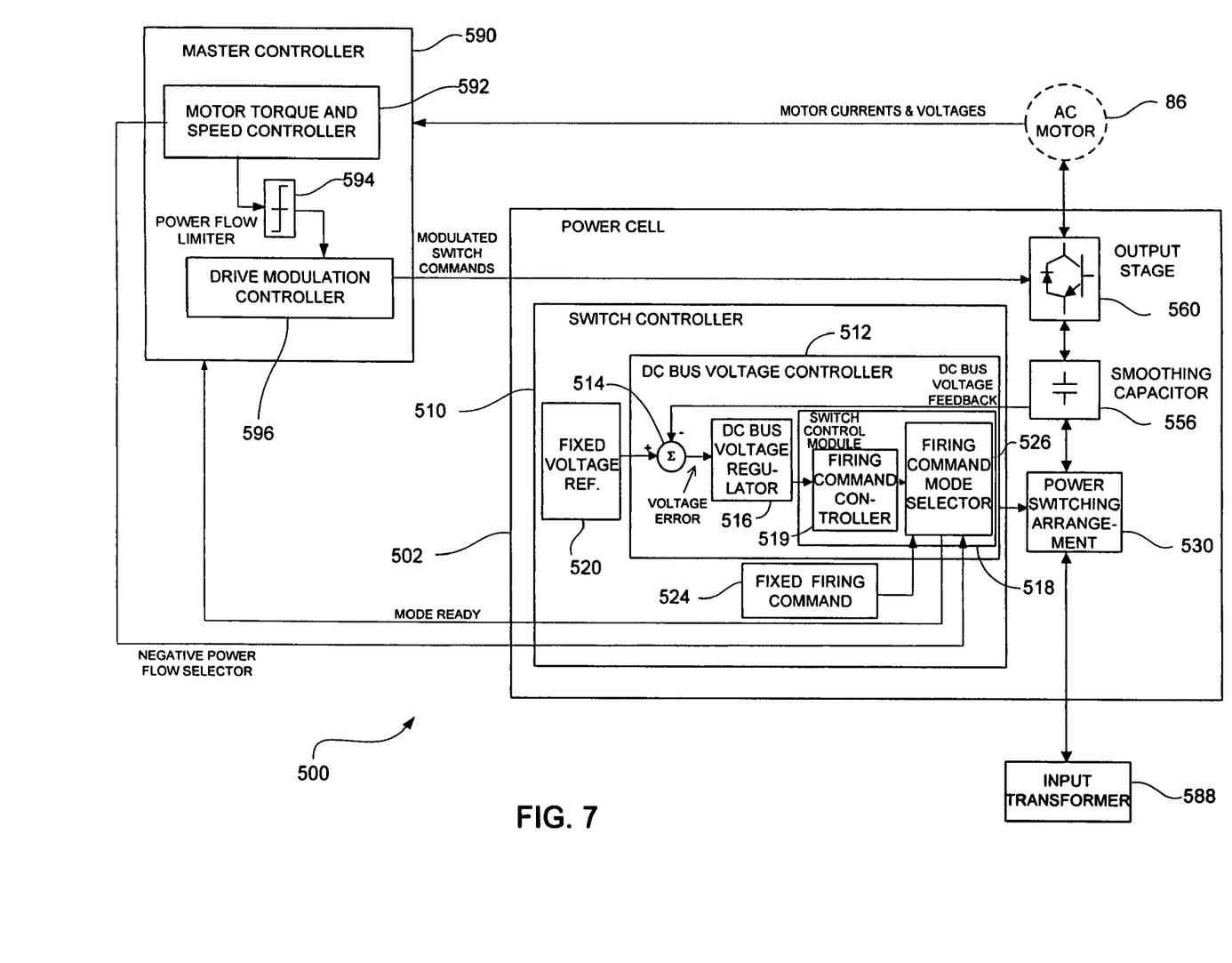
FIG. 7 is a block diagram illustrating a power cell control system according to an embodiment of the invention.

FIG. 7 illustrates a block diagram of a regenerative AC power conversion system 500 according to an aspect of the present invention. The power conversion system 500 includes a master controller 590 configured for modulation control of multiple power cells 502 to provide power to an AC motor 86. The power conversion system 500 further includes an input power transformer 588 that may be configured to receive power from a multiphase AC power source (not shown) and supply it to a plurality of power cells 502. In FIG. 7, only a single power cell 502 is illustrated. It will be understood, however, that the power conversion system 500 may include any number of power cells 502.

The block diagram of FIG. 7 illustrates the features of a particular control methodology that may be used in conjunction with power cells of the present invention. The master controller 590 of the power conversion system 500 includes a motor torque and speed controller 592, a power flow limiter 594 and a drive modulation controller 596. The master controller 590 monitors the currents and voltages in the AC motor 86. The power flow to and from the AC motor 86 is monitored by the motor torque and speed controller 592. When in motoring mode, the drive modulation controller 596 uses modulated switch commands to control the power transistors of the PWM output stage 560 in order to maintain the power flow to the AC motor 86 within the predetermined limits programmed into the power flow limiter 594.

The power cell 502 of the power conversion system 500 includes a power switching arrangement 530, a smoothing capacitor 556 and a PWM output stage 560, all of which may be configured according to the topology of the power cell 100 of FIG. 2. The power switching arrangement 530 is configured to include power switches that control the DC bus voltage in the motoring and regenerative operation modes. These switches may be SCRs as in the power cell 200 of FIG. 3.

The control methodology used in the power conversion system 500 differs significantly from that of the previous embodiments in that the control of the power switches of the power switching arrangement 530 is a direct function of the operating mode of the power conversion system 500. As before, the power cell 502 includes a switch controller 510 that includes a DC bus voltage controller 512 configured to monitor the DC bus voltage across the smoothing capacitor 556. As in the power conversion system 200 of FIG. 3, the DC bus voltage controller 512 is wired or programmed to include a summing junction 514 that subtracts the DC bus voltage value from a predetermined fixed voltage reference value 520 to determine a bus voltage error. The fixed voltage reference value 520 may be pre-programmed into the switch controller 510. The output of the summing junction 514 may be filtered using a high pass filter (not shown) to provide a filtered bus voltage error signal. The DC bus voltage controller 512 further includes a DC bus voltage regulator 516 which receives the bus voltage error signal and determines whether the voltage error signal is within predetermined limits. Responsive to a determination that the DC bus voltage is -outside predetermined limits, a signal is sent to a switch control module 518 having a firing command controller 519, which determines optimum firing commands to send to the power switches. A second possible firing command may be provided as a fixed predetermined command value 524 programmed or otherwise stored in the switch controller 510.

The switch control module 518 includes a firing command mode selector 526 in communication with the firing command controller 519 and the master controller 590. The firing command mode selector 526 is configured to select one of the first and second firing commands depending on the operating mode of the conversion system 500 as communicated to the firing command mode selector 526 by the master controller 590. The selected command is then sent to the power switching arrangement 530. In a typical usage scenario, the firing command mode selector 526 selects the fixed command value when the power conversion system 500 is in the motoring mode. This has the effect of essentially turning the power switching arrangement 530 into a diode bridge. When the master controller 590 detects that regeneration is required, it signals the firing command mode selector 526 to switch to regeneration mode, in which the firing command mode selector 526 selects the firing commands according to the output from the DC bus voltage controller 512. The bus voltage controller command is then used to command the power switches of the power switching arrangement 530 to control the DC bus voltage level in a manner similar to that of the previous embodiments. A mode ready signal may be used to signal the master controller 590 that the voltage error signal is within acceptable limits for changing operation modes.

The performance of the power conversion system 500 is similar to that of the power conversion system 400 of FIG. 6. As in the previous embodiments, the power conversion system 500 is fully operable in both motoring and regeneration modes. Like the power conversion system 400, the power conversion system 500 has the advantage of providing flexibility in the voltage reference used for different operating modes, which can provide a significantly better power factor during motoring operation.

As suggested by FIG. 7, the switch controller 510 may be physically located on the power cell 502. It will be understood by those of ordinary skill in the art that the switch controller 5 10 may alternatively be located in the master controller 590. In such embodiments, the master controller would include a switch controller 510 for each power cell 502 in the power control system.

Figure 8:
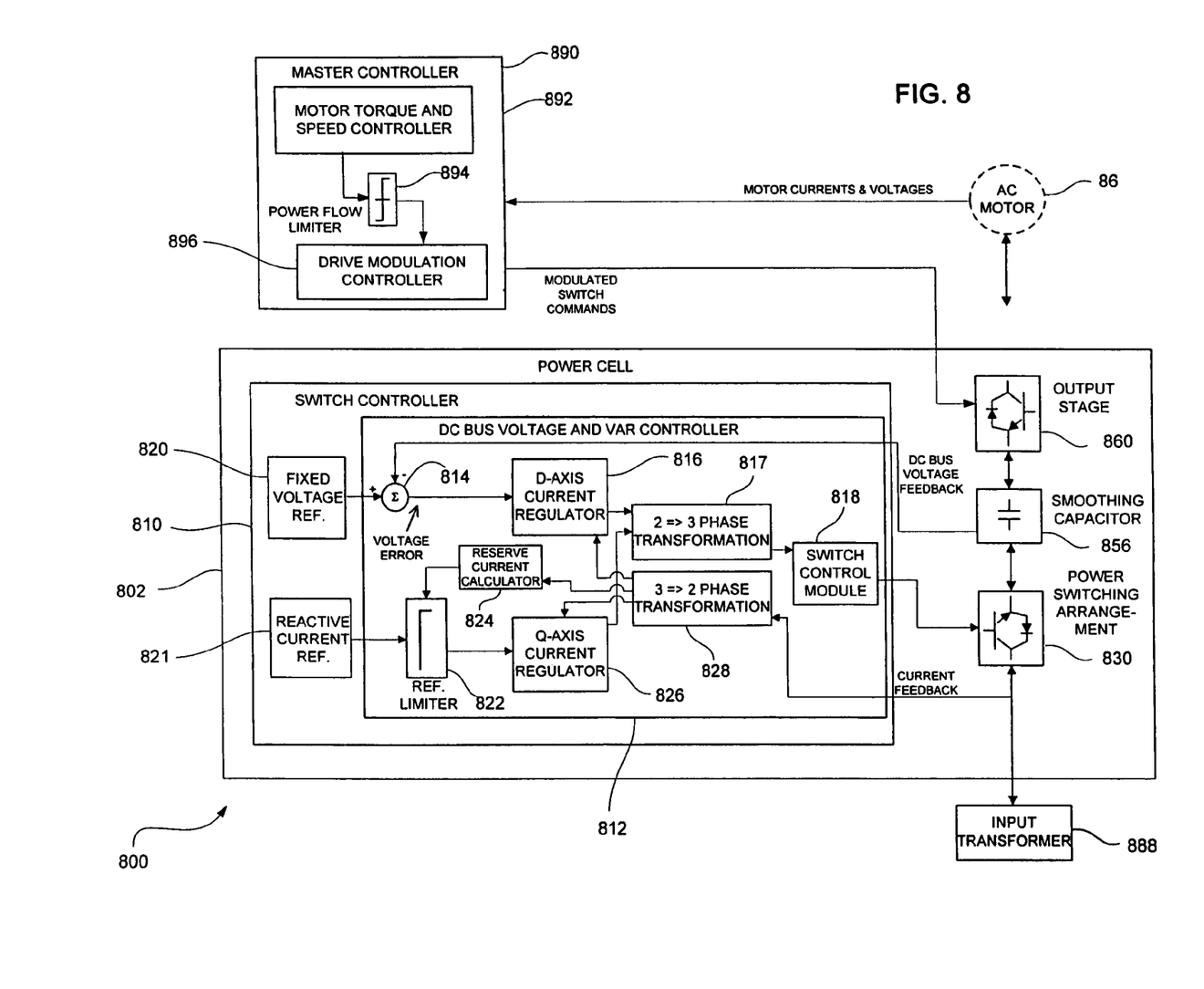
FIG. 8 is a block diagram illustrating a power cell control system according to an embodiment of the invention.

FIG. 8 illustrates a block diagram of a regenerative AC power conversion system 800 according to an aspect of the present invention. This block diagram illustrates the features of another control methodology that may be used in conjunction with power cells of the present invention. This control methodology provides the capability of controlling both real power and reactive power.

The power conversion system 800 includes a master controller 890 configured for modulation control of multiple power cells 802 to provide power to an AC motor 86. The power conversion system 800 further includes an input power transformer 888 that may be configured to receive power from a multiphase AC power source (not shown) and supply it to a plurality of power cells 802. In FIG. 8, only a single power cell 802 is illustrated. It will be understood, however, that the power conversion system 800 may include any number of power cells 802.

The master controller 890 of the power conversion system 800 includes a motor torque and speed controller 892, a power flow limiter 894 and a drive modulation controller 896. The master controller 890 monitors the currents and voltages in the AC motor 86. The power flow to and from the AC motor 86 is monitored by the motor torque and speed controller 892. When in motoring mode, the drive modulation controller 896 uses modulated switch commands to control the power transistors of the PWM output stage 860 in order to maintain the power flow to the AC motor 86 within the predetermined limits programmed into the power flow limiter 894.

The power cell 802 of the power conversion system 800 includes a power switching arrangement 830, a smoothing capacitor 856 and a PWM output stage 860, all of which may be configured according to the topology of the power cell 600 of FIG. 7. The power switches of the power switching arrangement 830 may be IGBTs or other switches of similar capability. The IGBTs of the power switching arrangement 830 are configured to control the DC bus voltage in the motoring mode and in the regenerative operation mode. The power cell 802 includes a switch controller 810 that includes a DC bus voltage and VAR controller 812 configured to monitor the DC bus voltage across the smoothing capacitor 856. The DC bus voltage controller 812 is wired or programmed to include a summing junction 814 that subtracts the DC bus voltage value from a predetermined fixed voltage reference value 820 to determine a bus voltage error. The fixed voltage reference value 820 may be pre-programmed into the switch controller 810. The output of the summing junction 814 may be filtered using a high pass filter (not shown) to provide a filtered bus voltage error signal, which is passed to a D-axis current regulator 816.

The D-axis current regulator 816 controls the current that is in phase with the voltage from the input transformer 888. The switch controller 810 also includes a Q-axis current regulator 826 that controls current that is 90 degrees out of phase with the voltage from the input transformer 888. Current feedback is provided to the D-axis current regulator 816 and the Q-axis current regulator 826 by a three-to-two phase transformation module 828 in electrical communication with the input transformer 888. Output from the D-axis current regulator 816 and the Q-axis current regulator 826 are passed to the switch control module 818 via a two-to-three phase transformation module 817.

The power cell 802 may be operated according to a control method in which the D-axis current regulator 816 controls the voltage of the DC bus and the Q-axis current regulator 826 controls the reactive current supplied to the input transformer 888. Operation of the fixed voltage reference 820 and the D-axis current regulator 816 is similar to that of the fixed voltage reference 320 and the DC bus voltage regulator of the system 300 shown in FIG. 5. Operation of the Q-axis current regulator 826 can be constrained by a reserve current calculator 824 in combination with a reference limiter 822. The reactive current reference 821 supplied to the reference limiter 822 may be fixed or changed periodically by the master controller 890. Use of the reserve current calculator 824 to constrain the Q-axis current regulator 826 allows the power cell to produce the maximum VARs possible given that the total of the D-Axis and the Q-Axis are limited by the physical capability of the power cell 802. The reserve current calculator 824 computes the available current capability accounting for the D-Axis requirements, which are a function of the power demands of the AC Motor 86, and then constrains the Q-Axis reference current accordingly.

Producing reactive current with the Q-axis current regulator 826 allows the system to supply leading or lagging VARs to the input transformer 888. In a system with many power cells 802, the VARs from each power cell 802 would be added by the input transformer 888 to provide total VARs. VARs can be used to control the power factor at important points within the connected utility. Power factor control can reduce the cost the of the facility where the motor drive is installed, thus increasing the value of the motor drive to the owner of the facility.

Embodiments of the present invention provide AC motor drives that combine the advantages of PWM motoring operation with the advantages of regeneration through the use of power switches that control the DC bus voltage experienced during both modes of operation. It will, however, be understood by those having ordinary skill in the art that the present invention also encompasses power converter embodiments that make use of a power cell configured for motoring only. These embodiments would require, for example, only forward-conducting SCRs, which would control the DC bus voltage of the power cells in the manner previously described for the motoring mode. Significantly, the present invention provides a power cell with power switches that may be controlled substantially independently of the of the PWM output stage of the power cell.

Although the foregoing description includes numerous details, it will be appreciated that these details have been included solely for the purpose of explaining specific embodiments of the invention. Numerous and significant variations of the details provided above will be readily apparent to persons skilled in the art which will remain within the scope and spirit of the invention, as defined by the following claims and their legal equivalents.

What is claimed is:

1. A power conversion system comprising:

a power transformer having at least one primary winding circuit and at least one secondary winding circuit, the primary winding circuit being electrically connectable to an AC power source;

at least one power cell, each of the at least one power cell having a power cell input connected to a respective one of the at least one secondary winding circuit, a single phase output connectable to a load, a power switching arrangement including at least one power switch connected to the power cell input and a DC bus, a switch controller connected to the power switching arrangement and the power cell input, a PWM output stage having a plurality of PWM switches connected to the DC bus and the single phase output, and a local modulation controller connected to the PWM output stage, wherein the switch controller is adapted for monitoring and controlling a DC bus voltage according to a predetermined control methodology in both a motoring mode in which power from the AC power source is supplied to the load by the at least one power cell and a regeneration mode in which power from the load is supplied to the AC power source by the at least one power cell; and wherein the switch controller and the local modulation controller of each of the at least one power cell are connectable to a master controller that is connectable to the load to monitor power flow thereto.

* * * * *